United States Patent [19]

Minami et al.

[11] Patent Number: 5,222,199
[45] Date of Patent: Jun. 22, 1993

[54] ROBOT CONTROL METHOD

[75] Inventors: Yoshikatsu Minami; Masato Tanaka, both of Kitakyushu, Japan

[73] Assignee: Kabushiki Kaisha Yaskawa Denki Seisakusho, Fukuoka, Japan

[21] Appl. No.: 684,921

[22] PCT Filed: Aug. 29, 1990

[86] PCT No.: PCT/JP90/01082
§ 371 Date: Apr. 15, 1991
§ 102(e) Date: Apr. 15, 1991

[87] PCT Pub. No.: WO91/03779
PCT Pub. Date: Mar. 21, 1991

[30] Foreign Application Priority Data

Aug. 29, 1989 [JP] Japan .................... 1-223986

[51] Int. Cl.$^5$ .............................. G05B 19/18
[52] U.S. Cl. ........................ 395/86; 395/89; 901/3
[58] Field of Search ............ 395/86, 89; 901/3, 4, 901/5

[56] References Cited

U.S. PATENT DOCUMENTS

| 4,456,961 | 6/1984 | Price et al. | 395/86 |
| 4,613,943 | 9/1986 | Miyake et al. | 395/86 |
| 4,817,017 | 3/1989 | Kato | 395/89 |
| 4,954,762 | 9/1990 | Miyake et al. | 395/86 |
| 5,020,001 | 5/1991 | Yamamoto et al. | 395/86 |
| 5,053,976 | 10/1991 | Nose et al. | 395/86 |

FOREIGN PATENT DOCUMENTS 0158447 10/1985 European Pat. Off. ........... 395/86

Primary Examiner—Allen R. MacDonald
Attorney, Agent, or Firm—Jordan and Hamburg

[57] ABSTRACT

In a method for changing the relative orientation between a workpiece held or clamped by a robot and an arbitrary working point, without changing a determined position, the working point is defined in a reference coordinate system of the robot. In a teaching operation, the workpiece is held or clamped by the robot with respect to the working point. The workpiece is then rotated about the working point so that the workpiece can assume a desired relative orientation with respect to the working point.

1 Claim, 6 Drawing Sheets

ROBOT CONTROL METHOD

FIELD OF THE INVENTION

The present invention relates to a motion control method for the teaching operation of a six-axis articulated robot.

BACKGROUND OF THE INVENTION

A conventional teaching operation is shown in FIG. 1. As shown, a teaching operation of a six-axis articulated robot, one of the following motion controls is carried out when the orientation of a workpiece 4 clamped is a tool (not shown) at each wrist flange of the robot as shown in FIG. 1(a) is changed to a desired relative orientation as shown in FIG. 1(c) with respect to an arbitrary working point A of a teaching operation tool 3:

(1) Each axis of the robot is controlled independently of the others, whereby a desired workpiece orientation is determined.

(2) A desired workpiece orientation is determined by the rotation around a reference coordinate axis on the main body of a robot and parallel displacement to the reference coordinate axis. (FIG. 1(b) and 1(c)).

(3) A desired workpiece orientation is determined by the rotation around the tool coordinate axis on the main body of the robot and parallel displacement to the tool coordinate axis. (FIGS. 1(b) and 1(c)).

The rotations described in (2) and (3) accomplish motion control by rotating around a control point R of a robot.

In method (2), the reference coordinate axes are defined by the reference coordinate axes ($X_R$, $Y_R$ and $Z_R$) which, in turn, define the coordinate system of the robot. In method (3), the tool coordinate axes refer to coordinates of a tool attached to the wrist flange of the robot.

However, according to the above-described methods, the workpiece 4 clamped by the robot assumes the desired orientation with respect to an arbitrary working point A by a method involving the control of each axis of the robot independently and the rotation of the workpiece around a coordinate axis with the control point R of the robot as the center of rotation with this method. The orientation of the workpiece 4 along cannot be changed without changing the position of the point P on the workpiece 4, meaning that the rotation and the parallel displacement must be repeatedly carried out, as shown in FIG. 1, resulting in a longer reaching operation time.

SUMMARY OF THE INVENTION

In view of the above, the primary object of the present invention is to attain a relative orientation between the workpiece 4 clamped by the robot and an arbitrary working point A without displacing the position of the point P as shown in FIG. 2.

For this purpose, the robot control method in accordance with the present invention is characterized by defining, through the reference coordinate system of the robot, an arbitrary working point A, and subsequently accomplishing the teaching operation of the workpiece 4 clamped or otherwise held by the robot with respect to the arbitrary working point, by controlling said arbitrary point A as viewed temporarily an end effector from a robot control point, and rotating the workpiece 4 about the working point, whereby the orientation of the workpiece relative to the working point A can be arbitrarily changed.

According to the present invention, the orientation of the workpiece clamped by the robot with respect to an arbitrary working point can be quickly changed to a desired orientation, thereby greatly shortening the teaching operation time.

DESCRIPTION OF THE PREFERRED EMBODIMENT

A preferred embodiment of the present invention will be described in detail hereinafter.

Figure 3:
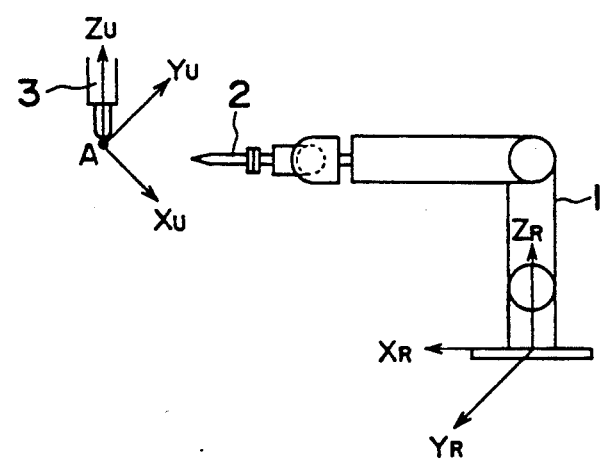
FIG. 3 and 4 are views used to explain the definition of an arbitrary working point.
Figure 4:
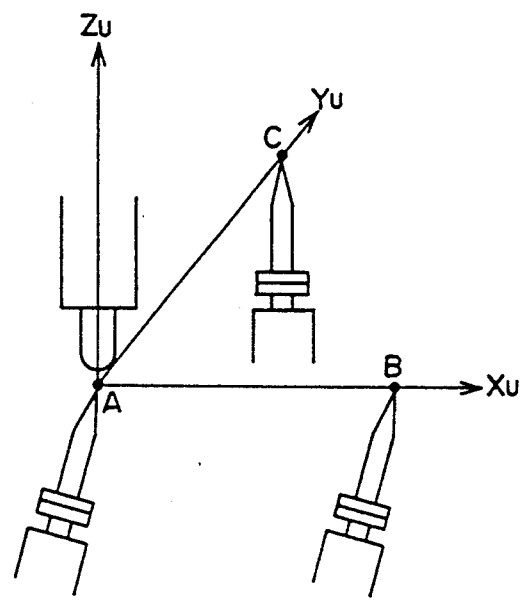

First, as is best shown in FIG. 3, a tool 2 whose dimension is measured with a high degree of accuracy is attached to the wrist flange of a robot 1, thereby distinctly indicting the coordinates of an arbitrary working point A with a teaching operation tool 3. Next, as shown in FIG. 4, the tool 2 is displaced to a point B and a point C. In this case, the relationships between the point A-C are as follows:

Point A . . . a working point (the origin of the coordinate system);
Point B . . . the direction of the Xu axis; and
Point C . . . the direction of the Yu axis.

Furthermore, the exterior products AB and AC are in the direction of the Zu axis.

Figure 5:
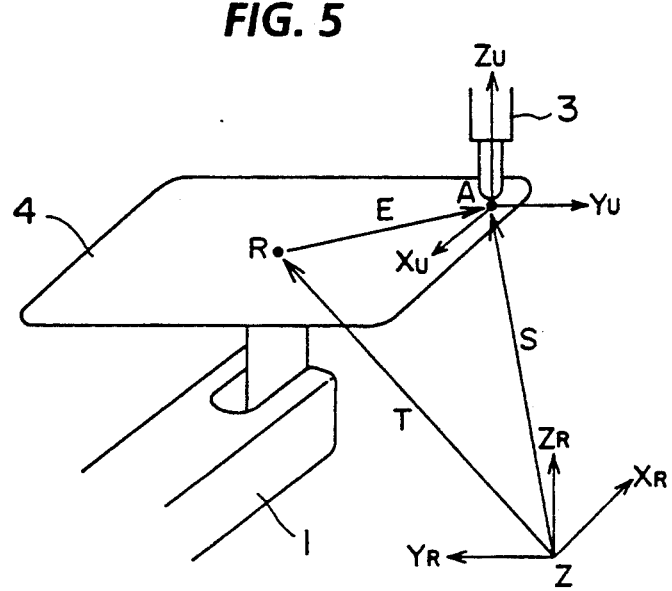
FIG. 5 is a vector diagram illustrating the relationship between a robot control point and an arbitrary working point.

As shown in FIG. 5, the coordinate system at an arbitrary working point A, viewed from the coordinates of the points A, B and C on the reference coordinate system Z of the robot, is defined as S (4×4 matrix).

$S = Z \cdot S$ where, $$S = \begin{bmatrix} n_{xs} & 0_{xs} & a_{xs} & P_{xs} \\ n_{ys} & 0_{ys} & a_{ys} & P_{ys} \\ n_{zs} & 0_{zs} & a_{zs} & P_{zs} \\ 0 & 0 & 0 & 1 \end{bmatrix}$$

$$Z = \begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

Furthermore, $$A = (P_{xs}\ P_{ys}\ P_{zs})$$

$$\bar{X}_u = (n_{xs}\ N_{ys}\ N_{zs})$$

$$\bar{Y}_u = (O_{xs}\ O_{ys}\ O_{zs})$$

$$\bar{Z}_u (a_{xs}\ a_{ys}\ a_{zs})$$

and $\bar{X}_u$, $\bar{Y}_u$ and $\bar{Z}_u$ represent a unit vector.

Next, in the teaching operation, an arbitrary working point A is calculated as an end effector, viewed from the control point R on the workpiece 4 clamped by the robot 1 (FIG. 5).

$$S = Z \cdot T \cdot E$$

$$E = T^{-1} \cdot S.$$

Where T is a matrix representing the control point R of the robot; and

E is a matrix representing an end effector from the control point R of the robot to the working point A.

For example, the rotation around Zu axis defined by the working point A will be explained. When the angle of the rotation is represented by $\theta$, the rotation matrix M is given by $$M = \text{Rot}(Z_u, \theta)\ \text{Rot}(Y_u, 0)\ \text{Rot}(X_u, 0) =$$

$$\begin{bmatrix} \cos\theta & -\sin\theta & 0 & 0 \\ \sin\theta & \cos\theta & 0 & 0 \\ 0 & 0 & 0 & 0 \\ 0 & 0 & 0 & 1 \end{bmatrix}$$

Since the apparent coordinate system S of an arbitrary working point A is represented by $$S' = S \cdot M$$

the robot orientation is obtained by calculating six-axis link angles from T' obtained from $$T' \cdot E = S'$$

and $$T' = S' E^{-1}.$$

In this case, for example, the arithmetic operation disclosed in Laid-Open Japanese Patent Application No. 62-198786 may be also used.

This operation or calculation will be described below.

Figure 6:
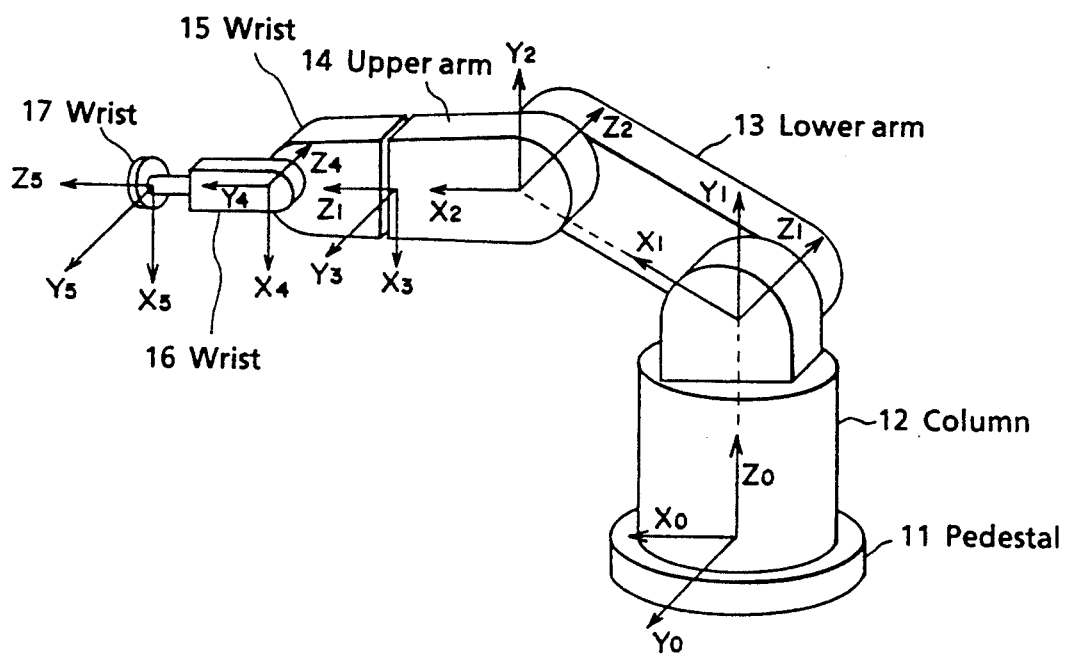
FIG. 6 is a view illustrating the outside appearance of a six-axis articulated robot.
Figure 7:
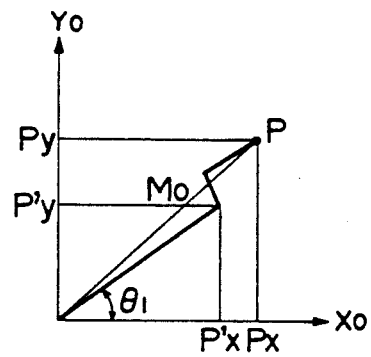
FIG. 7 is a view illustrating the projection over the Xo-Yo plane of the fixed coordinate system of a robot.
Figure 8:
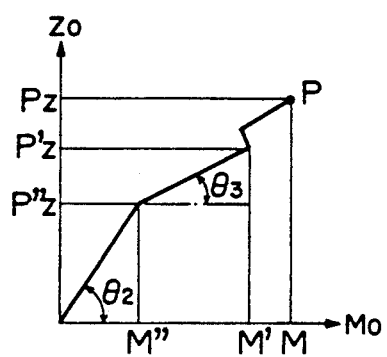
FIG. 8 is a view illustrating the projection over the Mo-Zo plane of a robot.

FIG. 6 illustrates the outside appearance of the six-axis articulated robot to be controlled; FIG. 7 illustrates a projection of the fixed coordinates ($X_o$, $Y_o$, $Z_o$) of the robot over the $X_o$-$Y_o$ plane; and FIG. 8 illustrates a projection of the robot over the $M_o$-$Z_o$ plane.

STEP 1: First, the position data Px, Py and Pz of the robot are given.

STEP 2: Under the condition that the wrists 15, 16 and 17 are not movable, the calculations of the link angles $\theta_1$, $\theta_2$ and $\theta_3$ of the fundamental three axes (body 12, lower arm 13 and upper arm 14) are calculated.

The operation is carried out by the following steps. As shown in FIG. 7, the robot is projected on the plane $X_o$-$Y_o$ of the fixed coordinate system, thereby obtaining $P_x$, $P_x{}'$, $P_y$ $P_y{}'$. Then the link angle $\theta_1$ is given by $$\theta_1 = \tan^{-1}(P_y{}'/P_x{}')$$

Next, it is assumed that the vector to the control point is $M_o$ and the plane $M_o$-$Z_o$ be defined. As shown in FIG. 8, the robot is projected over the plane $M_o$-$Z_o$, whereby $P_z{}'$, $P_z{}''$, M', M''.

Then, the link angles $\theta_2$ and $\theta_3$ are obtained from the following equations.

$$\theta_2 = \tan^{-1}(P'/M')$$

$$\theta_3 = \tan^{-1}(P_z{}'/M'').$$

Thus, the link angles $\theta_1$, $\theta_2$ and $\theta_3$ are obtained, but it is noted here that these angles result under the assumption that the wrists remain stationary. In other words, these are temporary or provisional results.

STEP 3: Next the orientation data $n_x$, $n_y$, $n_z$, $O_x$, $O_y$, $O_z$, $a_x$, $a_y$, and $a_z$ are inputted and calculated with the previously obtained $\theta_1$, $\theta_2$ and $\theta_3$ (temporary or provisional results), whereby the link angles $\theta_1$, $\theta_2$ and $\theta_3$ of a link flange are obtained. In this case, the arithmetic operations used in the conventional orientation control method are used to obtain the data for the wrist flange. The position data are not taken into consideration in this case. When, from the first to the sixth link coordinates, a matrix $A_n$ representing the orientation of the six-axis articulation as the product of the four simultaneous conversion by which the n-th link coordinates are associated with the (n−1)-th link coordinates is introduced, the coordinates $T_6$ of the wrist flange are represented by $$T_6 = A_1\ A_2\ A_3\ A_4\ A_5\ A_6$$

Rewriting the above formula, $A_3{}^{-1}\ A_2{}^{-1}\ A_1{}^{-1}\ T_6 = A_4\ A_5\ A_6$ $$\begin{bmatrix} CS \cdot S_{LU} & SS \cdot S_{LU} & -C_{LU} & -a_2 S_u \\ -SS & CS & 0 & -d_2 \\ CS \cdot C_{LU} & SS \cdot C_{LU} & -S_{LU} & -a_2 C_u \\ 0 & 0 & 0 & 1 \end{bmatrix} \begin{bmatrix} n_x & 0_x & a_x & 0 \\ n_y & 0_y & a_y & 0 \\ n_z & 0_z & a_z & 0 \\ 0 & 0 & 0 & 1 \end{bmatrix} = \qquad (1)$$

-continued
$$\begin{bmatrix} -CR \cdot CB \cdot CT + SR \cdot ST & CR \cdot CB \cdot ST + SR \cdot CT & -CR \cdot SB & -d_5SR \\ -SR \cdot CB \cdot CT + CR \cdot ST & SR \cdot CB \cdot ST - CR \cdot CT & -SR \cdot SB & -d_5CR \\ -SB \cdot CT & -SB \cdot ST & CB & d_4 \\ 0 & 0 & 0 & 1 \end{bmatrix}$$

is obtained
where, S, L, U, R, B and T represent $Z_1, Z_2 \ldots$, and $Z_6$-axes, respectively.

$SS = \sin\theta_1$, $S_{LU} = \sin(\theta_2 + \theta_3)$, $S_U = \sin\theta_3$ $CS = \cos\theta_1$, $C_{LU} = \cos(\theta_2 + \theta_3)$, $C_U = \cos\theta_3$ $SR = \sin\theta_4$, $SB = \sin\theta_5$, $ST = \sin\theta_6$ $CR = \cos\theta_4$, $CB = \cos\theta_5$, $CT = \cos\theta_6$ and
- $a_2$ = length of the arm of the L axis;
- $d_2$ = the distance between the center of rotation of the S axis and the center of rotation of the R axis,
- $d_4$ = the length of the arm of the U axis; and
- $d_5$ = the distance between the center of rotation of the R axis and the center of rotation of the T axis.

Rewriting Eq. (1), we have $-CR \cdot SB = a_x CS \cdot S_{LU} + a_y SS \cdot S_{LU} - a_z C_{LU}$ \quad (2)

$-SR \cdot SB = a_x SS + a_y CS$ \quad (3)

Further modifying Eqs. (2) and (3), we have $$\theta_4 = \tan^{-1}\left( \frac{a_x SS - a_y CS}{a_z C_{LU} - S_{LU}(a_x CS + a_y SS)} \right)$$

And $A_4^{-1} A_3^{-1} A_2^{-1} \cdot T_6 = A_5 A_6$ $$\begin{bmatrix} CS \cdot S_{LU} \cdot CR - SS \cdot SR & SS \cdot S_{LU} \cdot CR + CS \cdot SR & -C_{LU} \cdot CR & -a_2 S_u \cdot CR - d_2 SR \\ CS \cdot C_{LU} & SS \cdot C_{LU} & S_{LU} & -a_2 C_u - d_4 \\ CS \cdot S_{LU} \cdot SR - SS \cdot CR & SS \cdot S_{LU} \cdot SR - CS \cdot CR & -C_{LU} \cdot SR & -a_2 S_u \cdot SR - d_2 CR \\ 0 & 0 & 0 & 1 \end{bmatrix} \cdot T_6 =$$

$$\begin{bmatrix} CB \cdot CT & CB \cdot CT & -SB & 0 \\ -SB \cdot CT & SB \cdot CT & CB & 0 \\ ST & CT & 0 & -d_5 \\ 0 & 0 & 0 & 1 \end{bmatrix}$$

From Eq. (4), we have $-SB = a_x(CS \cdot S_{LU} \cdot CR - SS \cdot SR) + a_y(SS \cdot S_{LU} \cdot CR + CS \cdot SR) - a_z C_{LU} \cdot CR$ \quad (5)

$CB = a_x CS \cdot C_{LU} + a_y SS \cdot C_{LU} + S_{LU} a_z$ \quad (6)

From Eqs. (5) and (6), we have $$\theta_5 = \tan^{-1}\left( \frac{-S_{LU} CR(a_x CS + a_y SS) + SR(a_x SS - a_y CS) + a_z C_{LU} CR}{C_{LU}(a_x CS + a_y SS) + a_z S_{LU}} \right)$$

From Eq. (4), we have $ST = n_x(CS \cdot S_{LU} \cdot SR - SS \cdot CR) + n_y(SS \cdot S_{LU} \cdot SR - CS \cdot CR) - n_z C_{LU} \cdot SR$ \quad (7)

$CT = O_x(CS \cdot S_{LU} \cdot SR - SS \cdot CR) + O_y(SS \cdot S_{LU} \cdot SR - CS \cdot CR) - O_z C_{LU} \cdot SR$ \quad (8)

Assuming $K = CS \cdot S_{LU} \cdot SR - SS \cdot CR$, $L = SS \cdot S_{LU} \cdot SR - CS \cdot CR$, $M = C_{LU} \cdot SR$ then we have $$\theta_6 = \tan^{-1}\left( \frac{n_x K + n_y L - n_z M}{O_x K + O_y L - O_z M} \right)$$

STEP 6: Furthermore, based on the link angles $\theta_4$, $\theta_5$ and $\theta_6$ and the position data $P_x$, $P_y$, $P_z$, the position is corrected. Similar arithmetic operations are carried out so that the link angle $\theta_1 \ldots \theta_6$ of the three fundamental axes are obtained in the manner described above.

STEP 7: After completion of the arithmetic operations, the link angles $\theta_1 \ldots \theta_6$ are outputted. These link angles approximately satisfy the position data and the orientation data specified by $T_6$.

Furthermore, in response to a degree of accuracy defined by the mechanical factors of the robot and a degree of accuracy in the case of the robot operation, the abovedescribed arithmetic operations (STEPS 1-6) may be repeated until a desired degree of accuracy is obtained.

Figure 1:
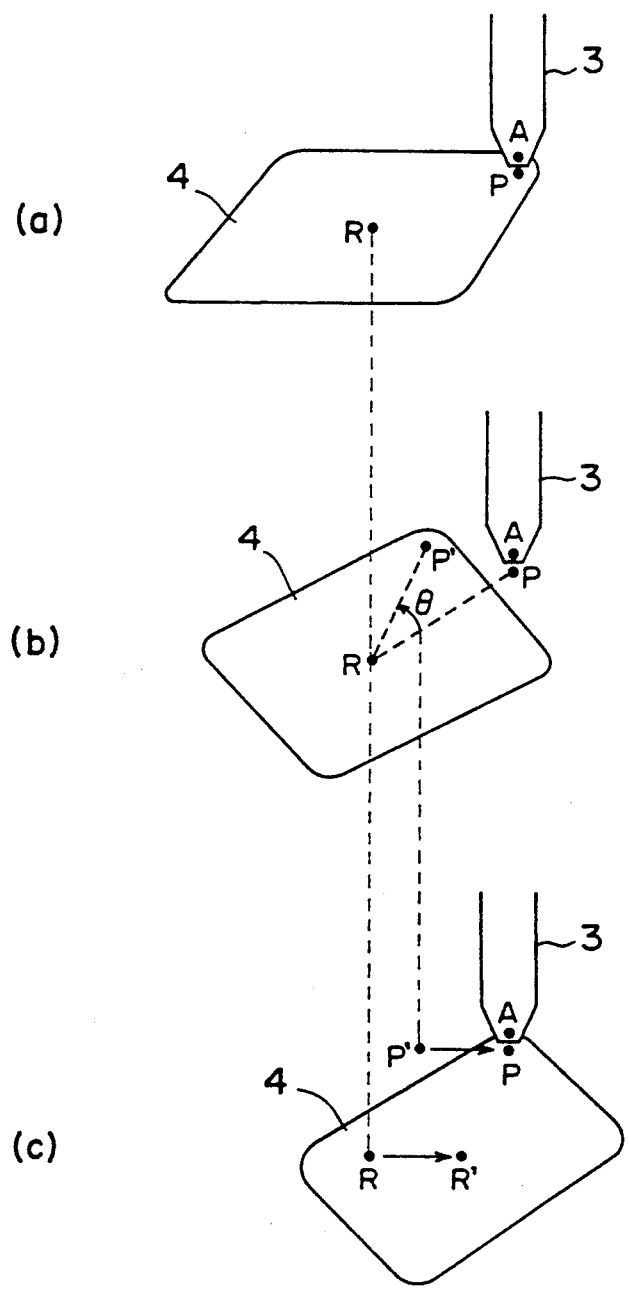
FIG. 1 is a view used to explain some conventional teaching operations.
Figure 2:
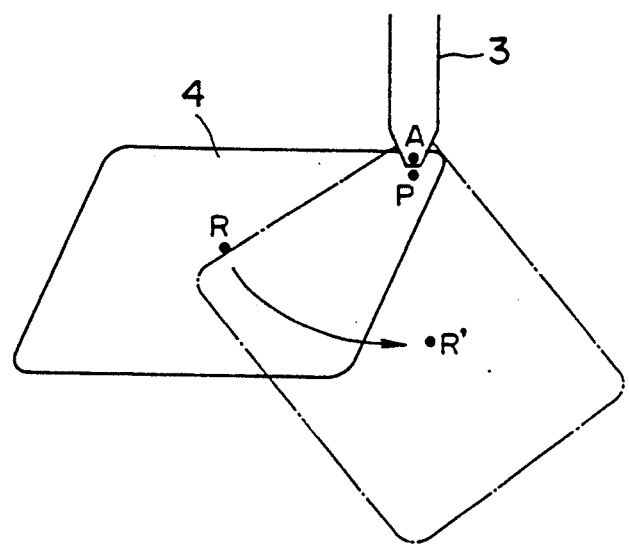
FIG. 2 is a view used to explain a teaching operation in accordance with the present invention.

In response to the link angles thus obtained, the operation command is delivered tot he axis so that the orientation of the workpiece 4 clamped by the robot can be handled as shown in FIG. 2. The same is true for the rotations about $X_u$ and $Y_u$ axes.

Figure 9:
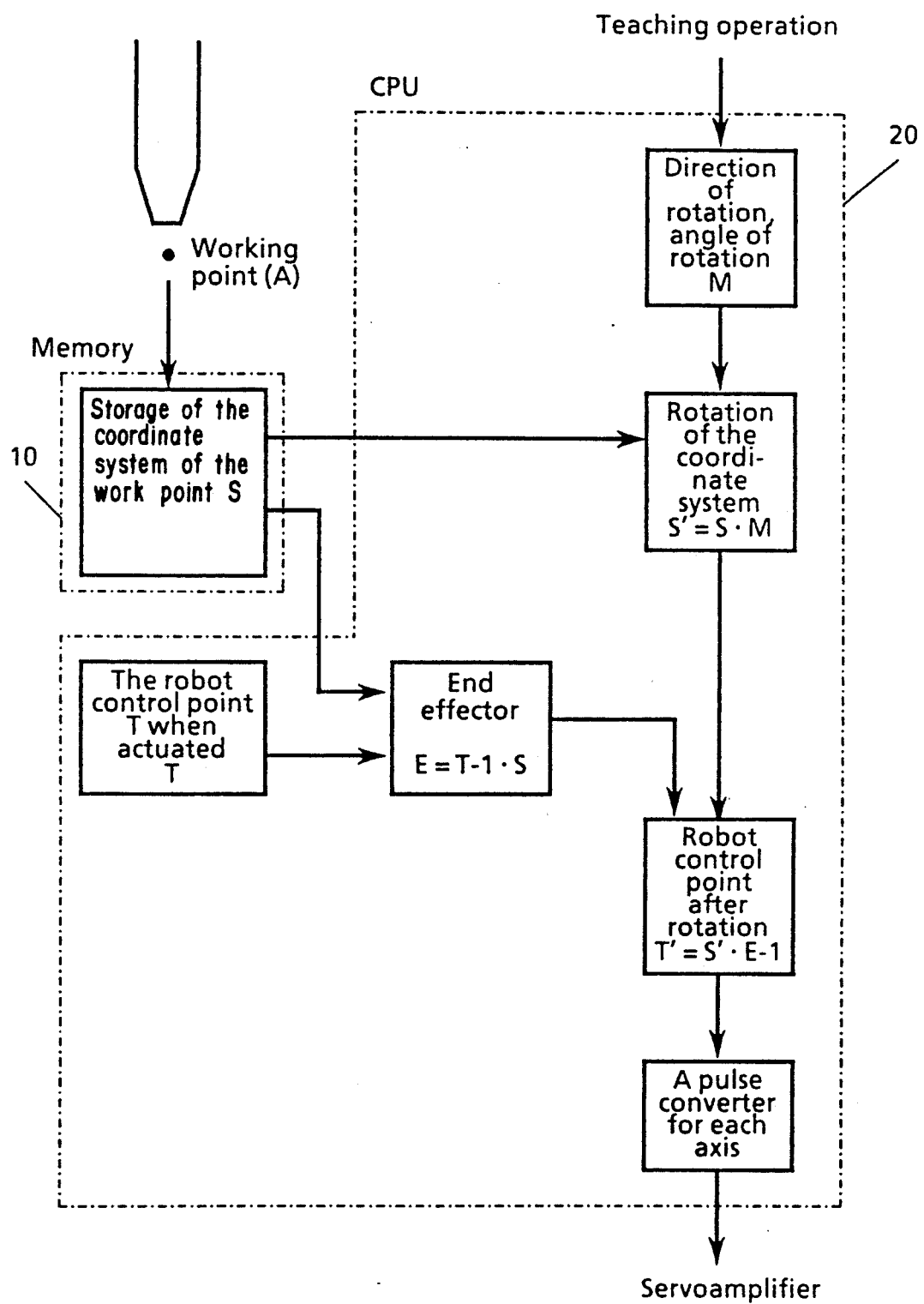
FIG. 9 is a block view illustrating the construction of a robot controller adapted for carrying out a robot control method in accordance with the present invention.

FIG. 9 is a block diagram illustrating the construction of a robot controller adapted to carry out the above described control method.

Figure 10:
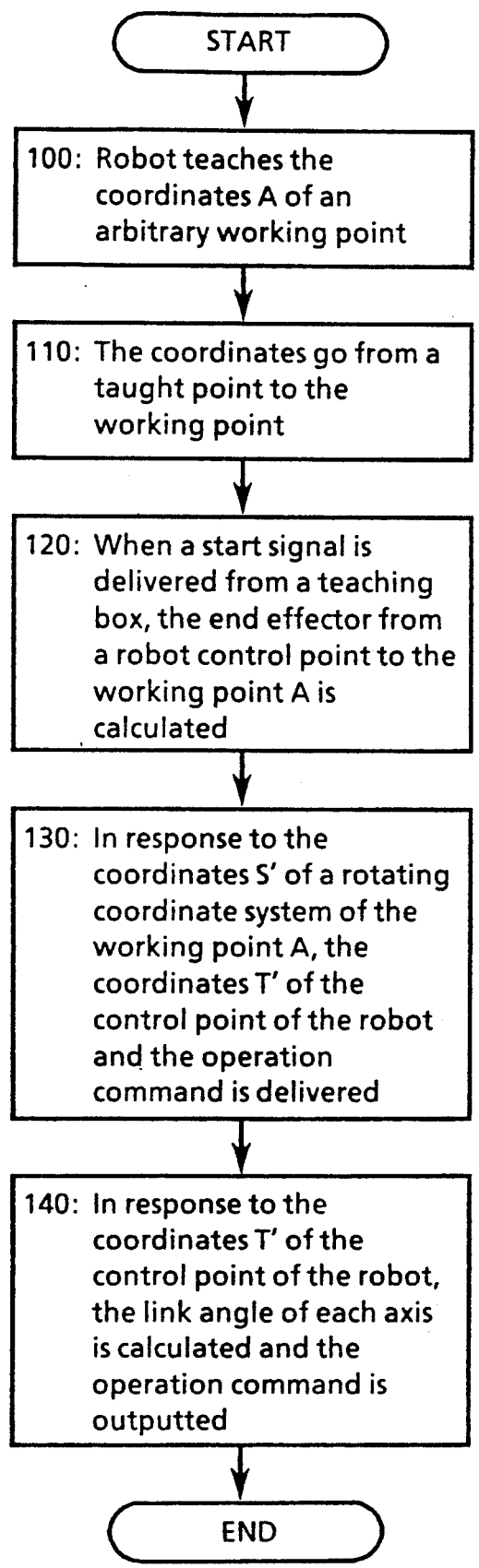
FIG. 10 shows a flowchart for carrying out the robot control method in accordance with the present invention.

As shown in FIG. 9, the robot controller consists of a memory 10 and a CPU 20. The operation of the robot controller will be described with reference to the flowchart illustrated in FIG. 10. First, at step 100, the robot teaches the coordinates of an arbitrary working point A. Next as shown in step 110, the coordinates S of the working point are calculated based on the teaching points and then stored in the memory areas of the memory 10. Third, at step 120, in response to the signal from a teach box, an operation command is delivered to the CPU 20 so that the end effector E from the control point R of the robot to the working point A is calculated. At step 130, in response to the rotating coordinate system S' of the working point A and the former end effector E, the coordinates T' of the control point of the robot are calculated. At the step 140, in response to the coordinates T' of the control point of the robot, the link angle of each axis is calculated and the operation command is outputted.

INDUSTRIAL FEASIBILITY

In the holding or clamping operation on a workpiece, which is one of an operation modes of the industrial robot, the teaching operation is remarkably enhanced according to the present invention.

We claim:

1. A robot control method comprising defining an arbitrary working point, in a reference coordinate system of a robot; performing a teaching operation using said working point as a temporary end effector from a robot control point of a workpiece held or clamped by said robot with respect to said working point; and rotating said workpiece about said working point, to change the orientation of said robot to a desired relative orientation with respect to said working point.

* * * * *